(12) United States Patent
Craven

(10) Patent No.: US 7,293,947 B2
(45) Date of Patent: Nov. 13, 2007

(54) SCREW HAVING A KNURLED PORTION

(75) Inventor: Arnold R. Craven, Chicopee, MA (US)

(73) Assignee: Phillips Screw Company, Wakefield, MA (US)

( * ) Notice: Subject to any disclaimer, the term of this patent is extended or adjusted under 35 U.S.C. 154(b) by 0 days.

(21) Appl. No.: 10/820,754

(22) Filed: Apr. 9, 2004

(65) Prior Publication Data

US 2005/0226701 A1  Oct. 13, 2005

(51) Int. Cl.
*F16B 25/10* (2006.01)

(52) U.S. Cl. ..................... 411/387.2; 411/399

(58) Field of Classification Search ............... 411/411, 411/413, 424, 386–387.8

See application file for complete search history.

(56) References Cited

U.S. PATENT DOCUMENTS

| | | | |
|---|---|---|---|
| 388,000 A | | 8/1888 | Rider |
| 430,236 A | * | 6/1890 | Rogers ................. 411/424 |
| 470,804 A | * | 3/1892 | Jones ................... 411/424 |
| 471,179 A | | 3/1892 | Jones |
| 877,131 A | * | 1/1908 | Searelle ................ 411/399 |
| 1,084,643 A | | 1/1914 | Lasater |
| 1,175,665 A | | 3/1916 | Sweet |
| 1,936,769 A | | 11/1933 | Olivet |
| 3,739,682 A | | 6/1973 | Siebol et al. |
| 4,621,963 A | * | 11/1986 | Reinwall ............... 411/369 |
| 4,653,244 A | * | 3/1987 | Farrell ................. 52/745.21 |
| 4,697,969 A | | 10/1987 | Sparkes |
| 5,516,248 A | | 5/1996 | DeHaitre |
| 5,518,352 A | * | 5/1996 | Lieggi ................... 411/399 |
| 5,558,097 A | | 9/1996 | Mallet et al. |
| 5,772,376 A | * | 6/1998 | Konig ................... 411/399 |
| 6,042,314 A | | 3/2000 | Guelck |
| 6,086,303 A | * | 7/2000 | Fluckiger .............. 411/399 |
| 6,109,850 A | | 8/2000 | Commins |
| 6,190,102 B1 | | 2/2001 | Vignotto et al. |
| 6,558,097 B2 | * | 5/2003 | Mallet et al. ........... 411/399 |
| 6,616,391 B1 | | 9/2003 | Druschel |
| 7,207,761 B2 | * | 4/2007 | Dill et al. .............. 411/450 |

* cited by examiner

Primary Examiner—Flemming Saether
(74) Attorney, Agent, or Firm—Dickstein Shapiro LLP

(57) ABSTRACT

A fastener for securing particle or bulge producing materials, a method of manufacturing the fastener, and a method of using the fastener are provided. The fastener has a thread on a shank, and a knurled portion disposed between the thread and a head. The fastener also may have at least one flute in the knurled portion, and may have at least one rib on the lower surface of the head. In use, the method is accomplished by inserting the fastener, by rotation, into a particle or bulge producing material, and producing particles or a bulge. Then, the method provides for transporting at least some of the particles from the particle producing material via the at least one flute, and securing the particle producing material to a base material. In a bulge producing material, the method provides for displacing the bulge into the material.

18 Claims, 15 Drawing Sheets ated with composite lumber is that
SCREW HAVING A KNURLED PORTION

BACKGROUND

The present invention relates generally to fastening systems. In particular, the present invention relates to a screw for penetrating and securing a particle producing material or a bulge producing material to a base material.

In construction and remodeling the use of cement board and similar materials has become common. Such materials can be literally sheets of cement, or other similar materials. Cement board is used in a variety of construction and remodeling applications. For example, cement board is prevalent and most desirable as a substrate in the tiling industry. The cement board can also be used as a subsurface or substrate for marble slabs on floors, walls and ceilings. Whereas a substrate such as plywood is good on floors and countertops where there are no water sources, such as showers, sinks, or faucets, cement board is impervious to water. Cement board resists swelling, softening, and deteriorating when exposed to water. Should water somehow get onto the cement board (e.g., through leaking pipes, cracked tiles or improperly grouted tiles) the cement board will remain a solid subsurface.

Cement board has other desirable characteristics. Cement board is easy work with; it is easy to handle and cut into desired pieces. It is usually delivered to the end user as a board of concrete, usually in 4 by 5 foot sections. It could range anywhere from a half inch thick for floors to ¼ inch thick for walls. The cement board can lay right on top of an existing subsurface, and it resists shifting.; Cement board has sufficient strength and stiffness, in wet and dry conditions, to resist deformation. Cement board also provides desired shear bond strength to secure tile to the board. It is dimensionally stable, and freeze/thaw and fire resistant.

Cement boards are typically attached to other materials by screw fasteners. One problem that exists when inserting a screw into a cement board is that small cement particles break off the cement board. Cement boards are particle producing materials. Such particles can adversely effect the insertion of the screw into the concrete board. For example, particles may become wedged between the screw and the concrete board and cause to screw to enter the concrete board on an angle. Also, particles may become wedged between the head of the screw and the cement board, thereby preventing the screw from seating flush with the surface of the cement board. It is therefore desirable to provide as screw that can move to the surface of the concrete board particles produced during the insertion of the screw. It is also desirable to provide a screw that can seat flush with the cement board.

Moreover, it is important that screws used with cement boards, and similar materials, avoid the possibility of failure due to fastener pull-through. Fastener pull-through occurs when the screw penetrates the concrete board to a point where the head of the screw no longer provides sufficient clamping force between the cement board and the base material. Thus, it is also desirable to provide a screw that avoids fastener pull-through.

What is needed is a fastener adapted for use with a particle producing material, such as a cement board, where insertion of the fastener removes particles produced by the material, provides desired clamping force and avoids fastener pull-through, and seats flush to leave a smoother surface on the particle producing material.

In addition, the use of composite lumber or materials alternative to wood is becoming more common. Such alternative materials have many advantages over wood. The alternative materials are often stronger and more durable then even pressure treated lumber. Many materials also offer better resistance to moisture, corrosive substances, termites and other insects, and other environmental strains that often prove to be detrimental to wood. Materials alternative to wood are used to construct everything from cabinets to decks. Such alternative materials are made by various processes. For example, alternative material or composite lumber may be made by blending recycled plastic resins with sawdust and extruding the blended mixture into standard lumber sections.

A problem associated with composite lumber is that conventional screws may produce unwanted results. Particularly, insertion of a conventional screw can cause remnants or shavings to be cut, extruded, or otherwise removed from the hole made by the screw, or may cause an undesirable bulge on the surface of the materials. Composite lumber is a bulge and/or remnant producing material.

What is needed is a fastener adapted for use with a bulge and/or remnant producing material, such as composite lumber, where insertion of the fastener does not cause formation of a bulge or remnants on the surface of the material, such that the screw seats flush and leaves a smoother surface on the material.

SUMMARY

The present inventions provide a screw fastener for securing particle producing materials and bulge and/or remnant producing materials, and a method of manufacturing the fastener. Methods of using the fastener, so that particles produced by insertion of the fastener into a particle producing material are substantially removed and are less likely to interfere with the insertion of the fastener, and so that bulges and/or remnants produced by insertion of the screw into a bulge and/or remnant producing material are displaced into the material, are provided.

In one aspect of the invention, a screw is provided comprising a shank having a tip at one end and a head at the other end. The screw has a thread on the shank, and a knurled portion disposed between the thread and the head. The screw also has at least one flute in the knurled portion, and at least one rib on a lower surface of the head.

In another aspect of the invention a screw is provided comprising a shank having a tip at one end and a head at the other end, and a thread on the shank. Also, a knurled portion is provided on the shank, disposed between the thread and the head, and at least one flute in the knurled portion.

In another embodiment a screw is provided comprising a shank having a tip at one end and a head at the other end, the head having a lower surface. The screw has a thread on the shank, and at least one flute disposed between the thread and the head. The screw also has at least one rib on said lower surface of the head.

In another embodiment a screw is provided having a shank with a tip at one end and a head at the other end, the head having a lower surface. A knurled portion is also provided on the shank, disposed between the thread and the head, and at least a first rib is provided on the lower surface of the head.

In another embodiment, the screw has a circumferential lip on the lower surface of the head. In another embodiment, the screw has a second rib on the lower surface of the head, the second rib being different from the first rib.

A method of using an embodiment of the screw comprises providing a screw shank having a tip, a thread, a knurled portion with at least one flute, and a head, and providing a particle producing material and a base material. The method is accomplished by inserting the screw, by rotation, into the particle producing material, and producing particles by rotation of the knurled portion in the particle producing material. Then, the method provides for removing the particles from the particle producing material via the at least one flute, and securing the particle producing material to the base material.

Another method of using an embodiment of the screw comprises providing a screw shank having a tip, a thread, a knurled portion and a head. The method is accomplished by inserting the screw, by rotation, into a bulge and/or remnant producing material and a base material, which may produce a bulge on a surface of the material. Then, the method provides for displacing any bulge into the material via the knurled portion.

Therefore, a fastener and a method for inserting the fastener are provided to answer a need that currently exists in the construction and the remodeling industry. These and other features and advantages of the invention will be more clearly understood from the following detailed description and drawings of preferred embodiments of the present invention.

DETAILED DESCRIPTION OF PREFERRED EMBODIMENTS

Figure 1:
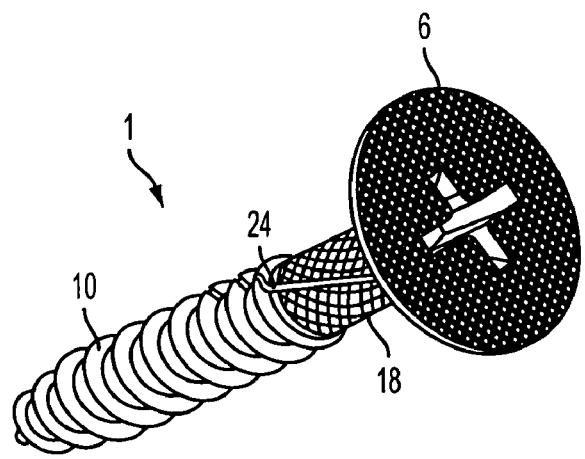
FIG. 1 is a perspective view of a screw according to a preferred embodiment of the present invention.
Figure 2:
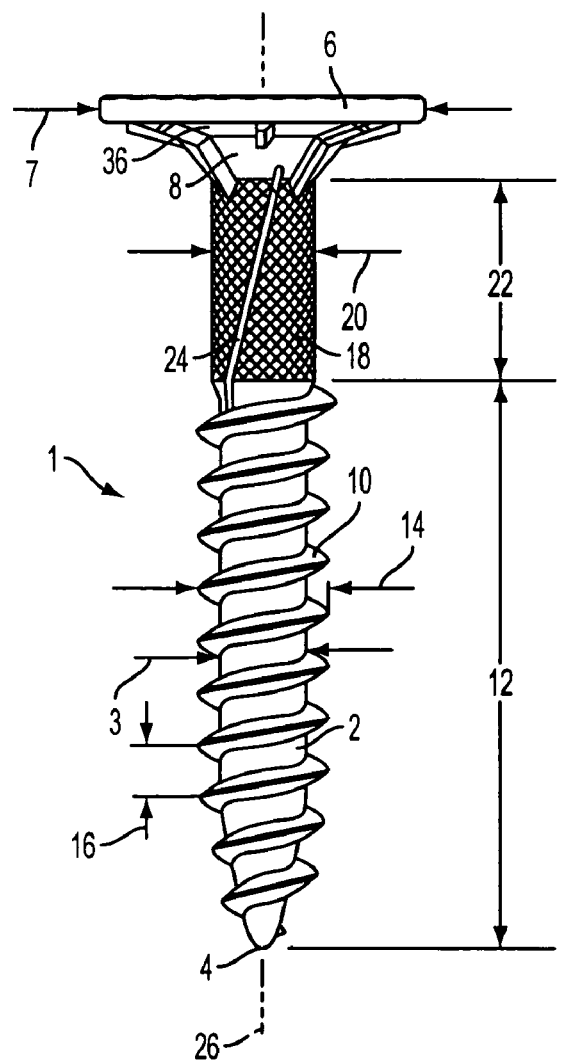
FIG. 2 is a side view of the screw of FIG. 1.

Refer now to FIGS. 1 and 2, there being shown a screw fastener, generally designated by reference numeral 1, according to a preferred embodiment of the present invention. The screw 1 has a shank 2 with a head 6 on one end and a tip 4 on the other end. The tip 4 is preferably a tapered tip. The shank has a diameter 3, and the head has a diameter 7 larger than the shank diameter 3.

A helical thread 10 is disposed on the shank 2. The thread 10 can be formed, for example, by rolling the shank 2 between a pair of die. In a preferred embodiment illustrated in FIG. 2, the thread 10 is a standard screw thread. Alternatively, the screw could be formed with a self-tapping thread or another suitable type of thread. The helical thread has a length 12 and a thread diameter 14. The thread diameter 14 is larger than the shank diameter 3, but smaller than the head diameter 7. The thread 10 has a thread pitch 16, which is generally the axial length, along axis 26, between adjacent crests of the thread 10. The thread diameter 14 and pitch 16 can be altered based on design and application configurations without departing from the spirit and scope of the invention.

The screw 1 also has a neck section 8. The neck section 8 in a preferred embodiment is tapered to gradually increase in diameter from the shank 2 to the head 6. Alternatively, the neck section 8 may be formed without a taper. Disposed between the head 6 and the thread 10 of the screw 1 is a knurled portion 18. Knurling is generally accomplished by a knurling tool, which under pressure creates a surface pattern by metal displacement. Generally, knurling is a method of squeezing the metal hard enough to cause plastic movements of metal into peaks and troughs. It is usually produced by forcing a knurling die into the surface of a rotating part, and displacing material from the original diameter. With reference to the knurled portion 18 in FIG. 2, the troughs of the knurled portion 18 are represented by solid lines and the peaks are represented by squares or diamonds between the solid lines. The radial height of the peaks over the troughs represents the coarseness of the knurled portion 18. In use, and as described in greater detail below, the knurled portion 18 cuts and grinds the cement board when the screw 1 is rotated. The coarseness of the knurled portion 18 can be chosen to optimize the desired rate of cutting and grinding for a particular type of cement board.

The knurled portion 18 has a length 22 and a diameter 20. As seen in FIG. 2, the diameter 20 of the knurled portion is larger than the diameter 3 of the shank 2, but smaller than the diameter 7 of the head 6. The knurled portion diameter 20 is shown as being smaller than the thread diameter 14, but alternatively could be equal to or larger than the thread diameter 14. In a preferred embodiment, the length 22 of the knurled portion 18 is smaller than the length 12 of the thread 10. The length 22 of the knurled portion 18 can vary, however, based on various design characteristics, such as the coarseness of the knurled portion 18, and the type of cement board the screw 1 is to be used with.

The screw 1 also has a flute 24 formed in the knurled potion 18. The flute 24 is essentially a channel or a groove, and can be formed, for example, by die that are used to form the knurled portion 18. The flute 24 runs through the knurled portion 18, and generally has a length sufficient to extend the flute at least from one end of the knurled portion 18 to the other. As can be seen in FIGS. 1 and 2, the flute 24 may also extend onto the neck 8 on one end and onto the threads 10 on the other end. Alternatively, the flute 24 can be formed so as to be confined within the knurled portion 18. As seen in FIGS. 1 and 2, the flutes 24 in a preferred embodiment are formed on an angle with respect to the axis 26 of the screw 1. In a preferred embodiment, the angle of the flutes 24 is in the same direction, with respect to the axis 26, as the angle of the helical thread 10. Forming the flutes 24 on an angle helps the flutes 24 remove particles cut from the cement board during insertion of the screw 1, as discussed in greater detail below. The angle of the flutes may be altered based upon design or application considerations without departing from the scope of the invention.

In use, and as described in more detail below, the flutes 24 function to move particles formed by the knurled portion 18 as the screw 1 is inserted into a cement board. The flutes 24 also provide cutting surfaces to aid the knurled portion 18 in cutting the cement board to prepare the cement board for seating of the screw 1. In a preferred embodiment, the screw 1 has two flutes 24 diametrically opposed from each other. Such a configuration has been found to provide effective cutting and removal of particles during insertion of screw 1 into a cement board. However, one flute or three or more flutes can be formed without departing from the spirit and scope of the invention.

Figure 3:
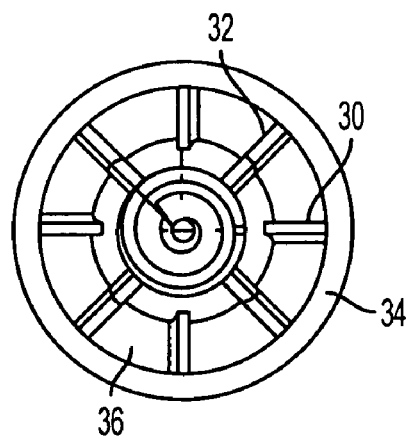
FIG. 3 is a bottom view of the screw of FIG. 1.

The neck 8 and head 6 of the screw 1 will next be described with reference to FIGS. 2-5. FIG. 3 shows a bottom view, or underside of the head 6, looking from the tip 4 toward the head 6 of the screw 1. The underside, or lower surface of the head 6 has several ribs 30, 32 extending on its surface. The ribs 30 are short ribs; they are formed on the lower surface of the head 6 and do not extend onto other portions of the screw 1. The ribs 32 are long ribs, and are formed on the lower surface of the head 6, and also extend onto the neck 8. In a preferred embodiment, there are four short ribs 30, and four long ribs 32. In the alternative, more or less ribs 30, 32 can be formed on the screw 1. The number and sizes of the ribs 30, 32 can be altered without departing from the scope of the invention. Also, the screw 1 can be formed with only short ribs 30, only long ribs 32, or without any ribs. In use, as discussed in greater detail below, the ribs 30, 32 perform final cutting of the cement board to allow the head 6 of the screw 1 to seat flush with the cement board.

Figure 14:
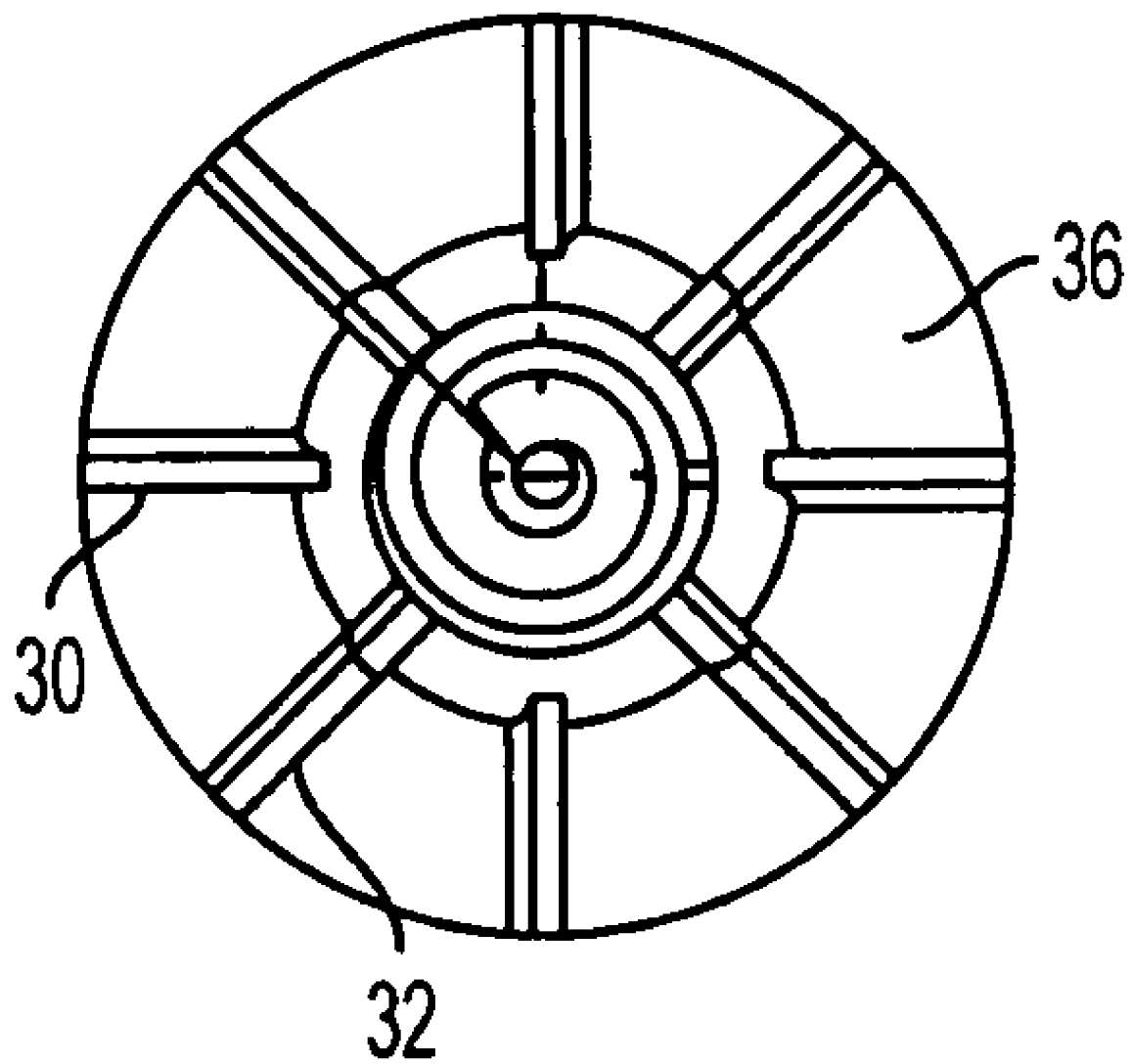
FIG. 14 is a bottom view of a screw according to another preferred embodiment of the present invention.

The head 6 has a circumferential lip 34 that extends about the circumference of the underside, or lower surface of the head 6. The circumferential lip 34 provides a surface for improved clamping of the cement board to a base material, and also assists in preventing fastener pull-through. As best seen in FIG. 3, the ribs 30, 32 do not extend onto the circumferential lip 34. Alternatively, the head 6 may be formed without a circumferential lip 34. In such an embodiment, illustrated in FIG. 14, the ribs 30, 32 (if formed) would extend to the outer edge of the underside, or lower surface of the head 6.

The head 6 further has flat land areas 36 that extend between adjacent ribs 30, 32. The flat land areas 36 are substantially flat surfaces, as opposed to a channel or a flute, that extend between adjacent ribs 30, 32. With reference to FIGS. 2 and 3, the flat land areas 36 have a slight taper, and extend from the neck 8 to the circumferential lip 34. The slight taper of the flat land areas 36 provides improved clamping of the cement board to a base material, and assists in preventing fastener pull-through. In the alternative, the flat land areas 36 can be formed with no taper. In use, particles cut from the cement board by the knurled portion 18 and the ribs 30, 32 travel past the flat land areas 36 without impedance to prepare the cement board for seating of the screw 1. The lower surface of the head 6 of the preferred embodiment provides maximum clamping surface area, and helps prevent the screw 1 from breaking through the cement board. Such design is often required by building codes.

Figure 4:
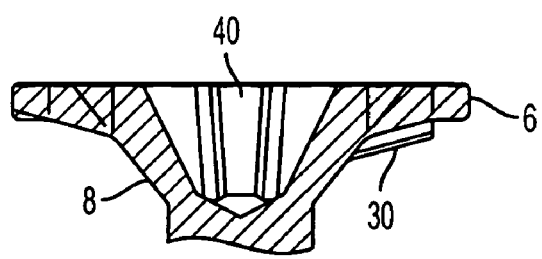
FIG. 4 is a side-sectional view of a head of the screw of FIG. 1.
Figure 5:
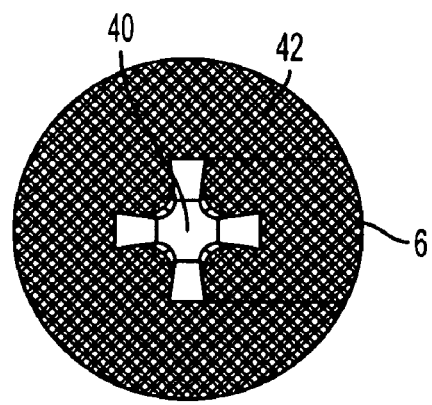
FIG. 5 is a top view of a head of the screw of FIG. 1.

Referring now to FIGS. 4 and 5, the top side of the head 6 has a recess 40 to accommodate a driving tool. The recess 40 could be slotted or cruciform shaped, or any other suitable configuration. The head 6 has a top surface 42 which has a rough finish. The rough finish of the top surface 42 improves adhesion of mortar, or similar products, when such products are applied over the head 6 of the screw 1. Alternatively, the top surface 42 may have a smooth finish.

Figure 6:
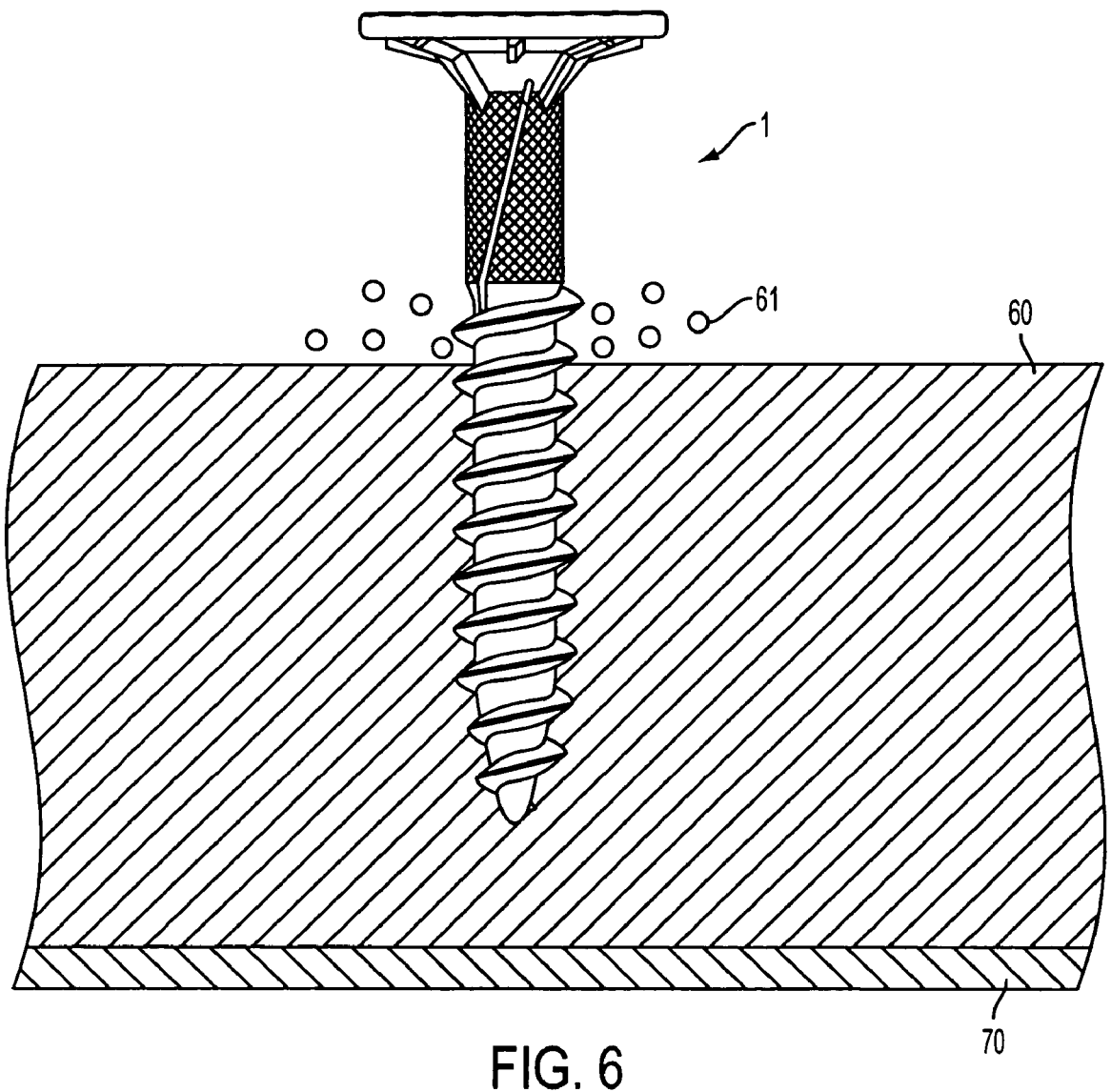
FIGS. 6-10 are partial cross-sectional views showing the screw of FIG. 1 engaged in a particle producing material.

Use of the screw will now be described with reference to FIGS. 6-10. As shown in FIG. 6, the screw 1 is partially inserted into a particle producing material 60. The particle producing material 60 can be a cement board, or another type of suitable material. The screw 1 is inserted by transmitting rotational force to the recess 40 in the head 6 through manual or mechanical input. The rotation of the screw 1 causes the threads 10 to pull the screw 1 into the particle producing material 60 and toward a base material 70. The threads 10 have an auger-type effect on the particle producing material 60, and cause particles 61 to be extruded to the surface or the particle producing material 60.

Figure 7:
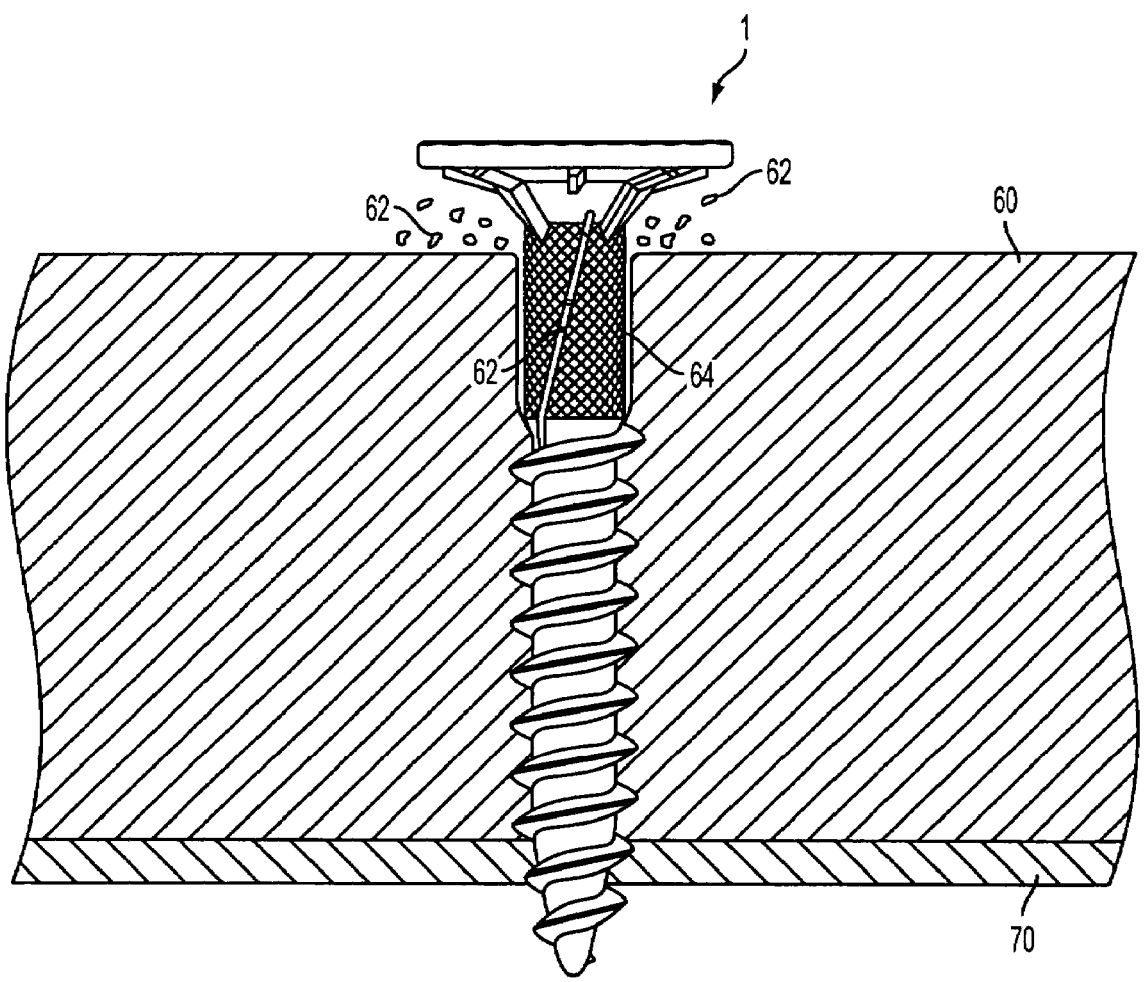

With reference to FIG. 7, the threads 10 of the screw 1 are fully inserted into the particle producing material 60. At this stage, the knurled portion 18 has also entered the particle producing material 60. The knurled portion 18 cuts, grinds and shaves the particle producing material 60 as the screw 1 is rotated. As a result, particles 62 are produced. The particles 62 produced by rotation of the knurled portion 18 could be smaller in size than the particles 61 produced by the rotation of the threads 10. Particles 62 could be smaller because the raised edges, or peaks, of the knurled portion 18 produce smaller particles that are cut and ground from the particle producing material 60. At this stage, the tip 4 of the screw 1 may be engaged with the base or anchor material 70. The base or anchor material 70 can be a metal or wood stud, an underlying substrate, or any other type of base material to which the particle producing material 60 is to be affixed.

The cutting and grinding of the particle producing material 60 also produces a bore 64 in the particle producing material 60. The bore 64 is advantageous because it ensures that the screw 1 remains straight, or perpendicular to the material 60, as it is inserted into the material 60. Without the knurled portion 18 creating the bore 64, the screw 1 may become skewed when it enters the particle producing material 60. For example, a cut particle 61, 62 may become wedged between the shank 2 or other portion of the screw 1 and the particle producing material 60, and cause the screw 1 to become skewed and enter the material 60 at an angle.

The flutes 24 help remove the cut particles 62 to the surface of the material 60. As illustrated in FIG. 7, at least some particles 62 are captured by the grooves or channels in the flutes 24, and are carried to the surface by the flutes 24 as the screw 1 is rotated. As discussed above, the flutes 24 can be formed on an angle with respect to the axis 26, in the same direction as the helix angle of the threads 10. The depth of the flutes 24 can be varied to accommodate different materials that may produce different size particles 62. For example, if the screw 1 is destined for use with a material that tends to produce larger particles 62, the depth and/or width of the flutes 24 may be made larger to accommodate those particles. Also, if the knurled portion 18 is made to cut and grind larger-sized particles 62, the flutes 24 may be made wider and/or deeper to accommodate such a knurled portion 18. The trailing edge of the flutes 24 also can provide a cutting surface, in addition to the cutting and grinding surfaces of the knurled portion 18.

Figure 8:
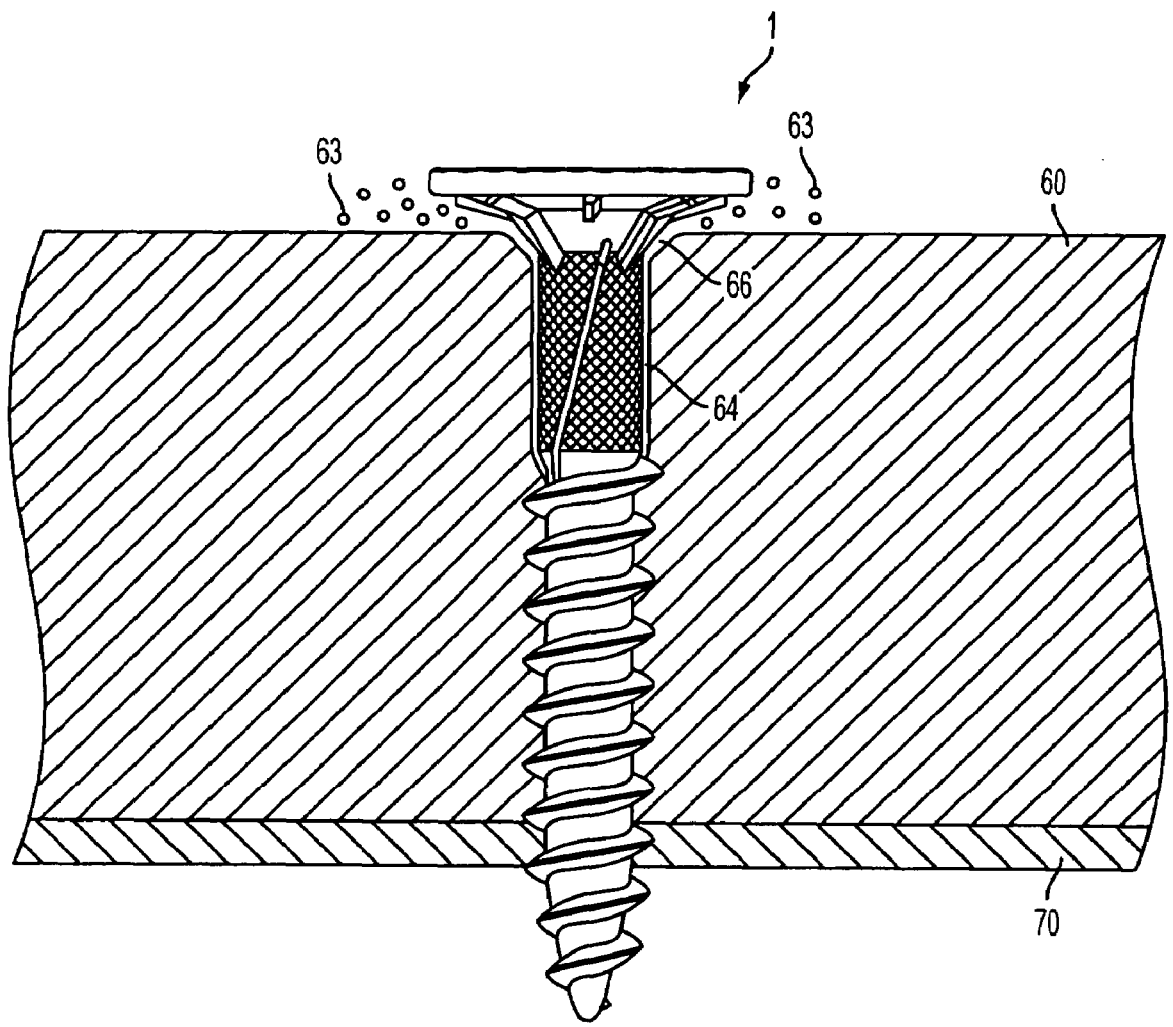
Figure 9:
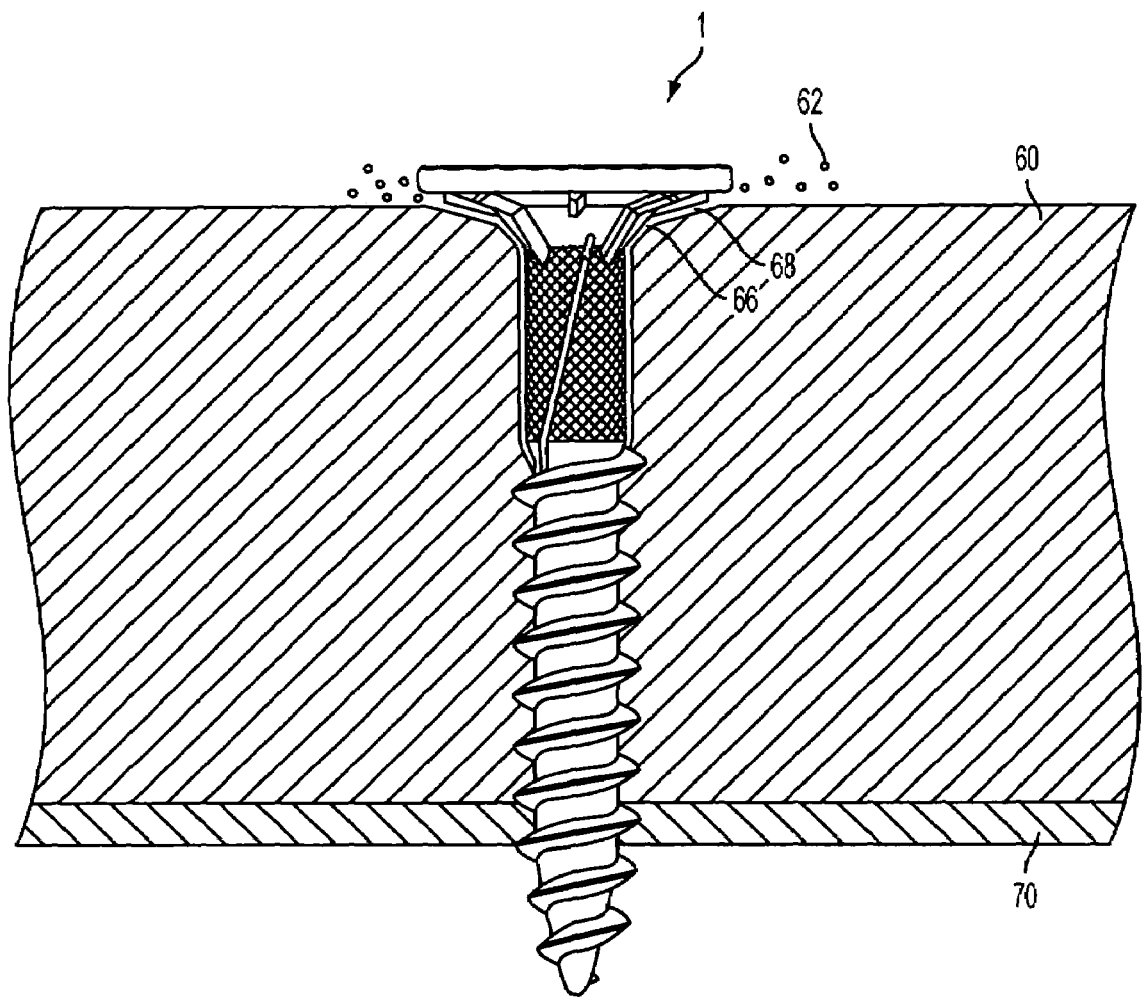

With reference to FIG. 8, the screw 1 has entered the particle producing material 60 to a depth where the long ribs 32 on the neck 8 come into contact with the particle producing material 60. The long ribs 32 have cutting edges that cut, grind or shave the particle producing material 60 to produce particles 63. The particles 63 can be similar in size to particles 62 cut by the knurled portion 18 in a preferred embodiment of the screw 1. The size of the particles 63 may vary, however, depending on the size of the long ribs 32 relative to the configuration of the knurled portion 18. The long ribs 32 enlarge the bore 64 to a larger opening 66 to accommodate the neck 8. The larger opening 66 prepares the particle producing material 60 for seating of the neck 8 and head 6 of the screw 1.

Figure 10:
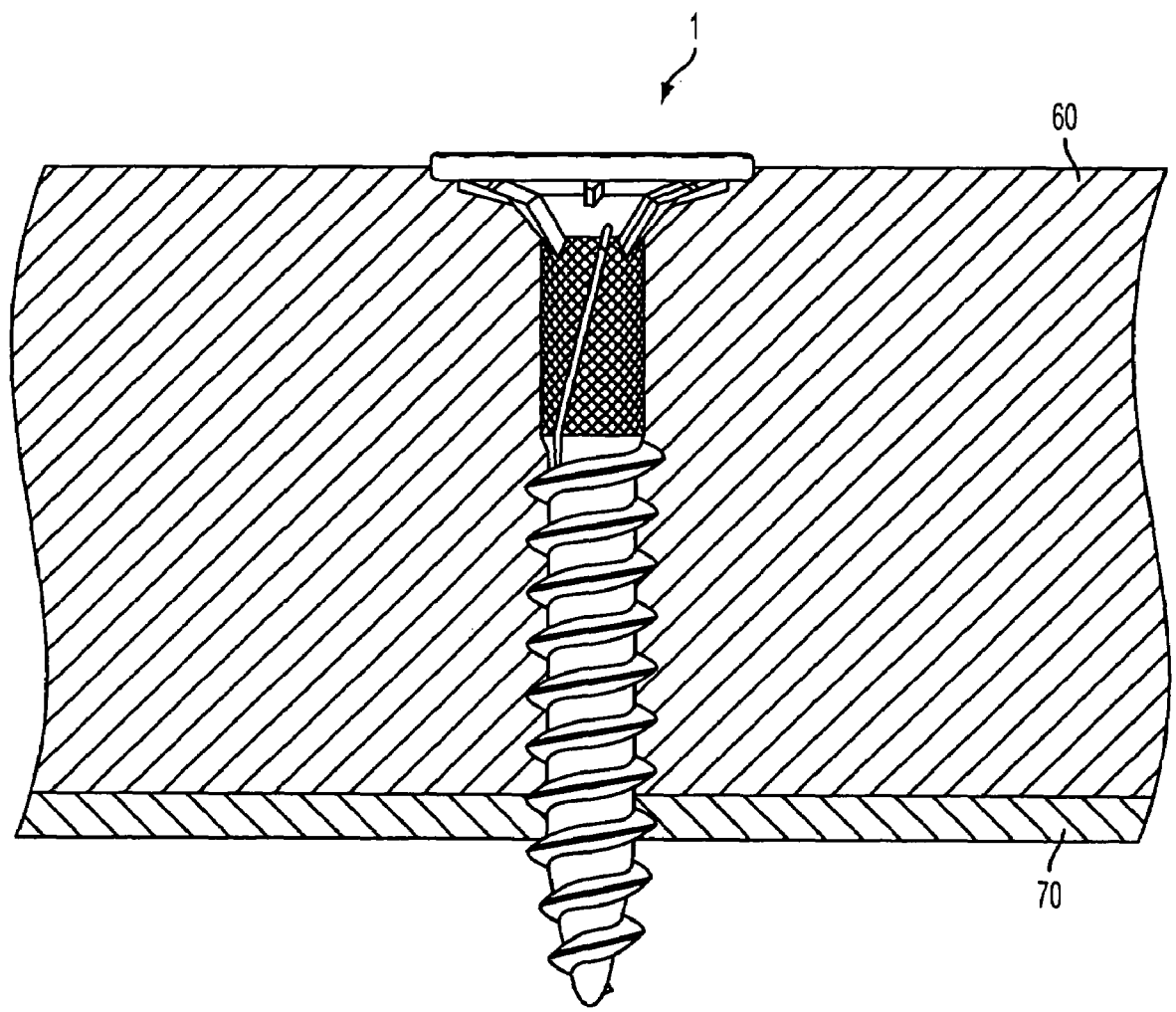

Further rotation of the screw 1 causes the short ribs 30 on the land areas 36, and portions of the long ribs 32 disposed on the land areas 36, to come in contact with the particle producing material 60. This can be seen in FIG. 9. The short ribs 30 and portions of the long ribs 32 cut, grind or shave material to further enlarge the opening 66 to an opening 68. The opening 68 is cut in the particle producing material 60 to accommodate the head 6 of the screw 1. Further rotation of the screw 1 causes the head 6 to come in contact with the particle producing material 60, as illustrated in FIG. 10. At this stage, the circumferential lip 34 and the land areas 36 are firmly seated against the particle producing material 60 to provide maximum clamping force between the material 60 and the base material 70. As discussed above, the head 6 of the screw 1 may be formed without the circumferential lip 34, and with ribs 30, 32 extending to the outermost periphery of the head 6. In such an embodiment the opening 68 would accommodate the outer periphery of the head 6, and the head 6 would seat flush with the top surface of the particle producing material 60.

Figure 11:
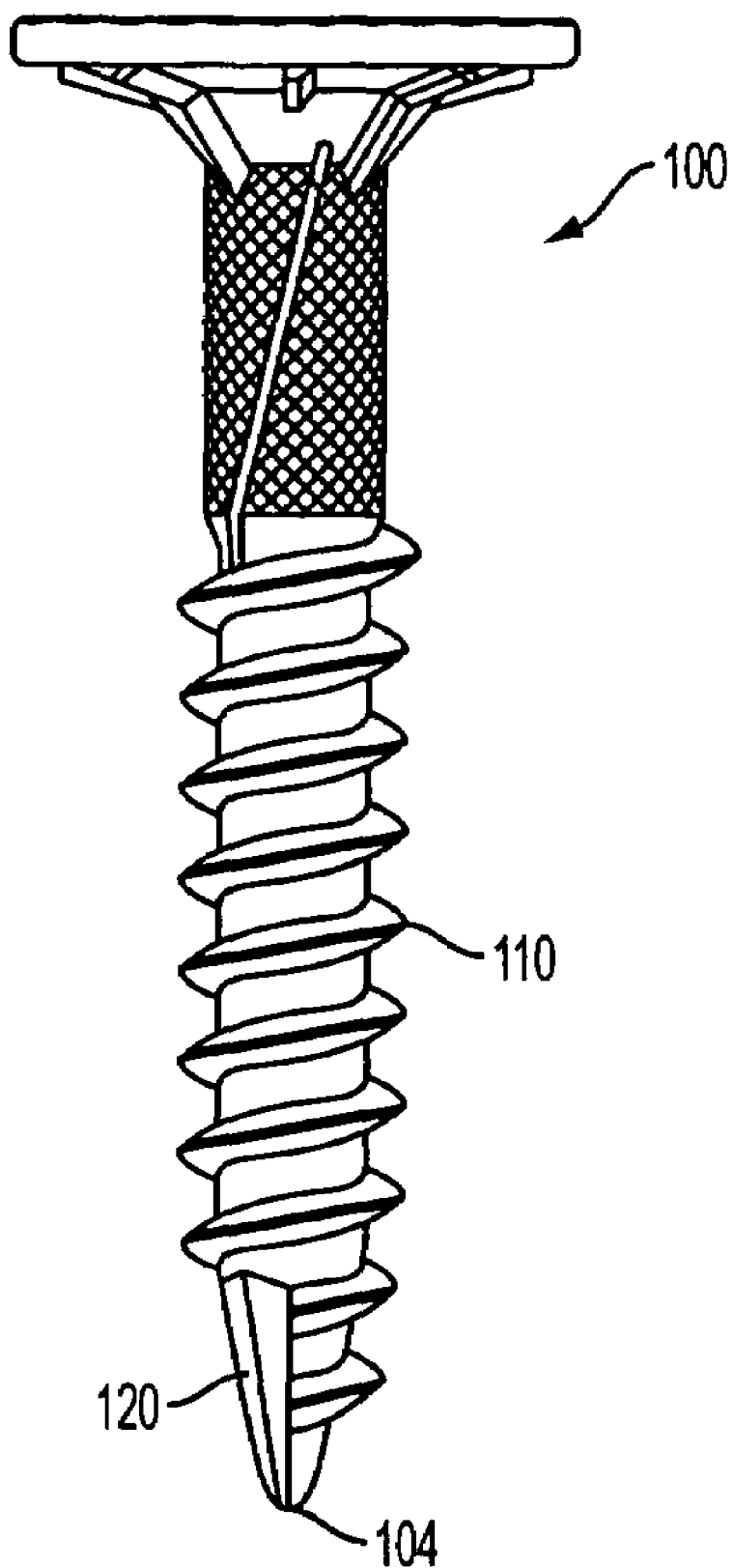
FIG. 11 is a side view of a screw according to another preferred embodiment of the present invention.
Figure 12:
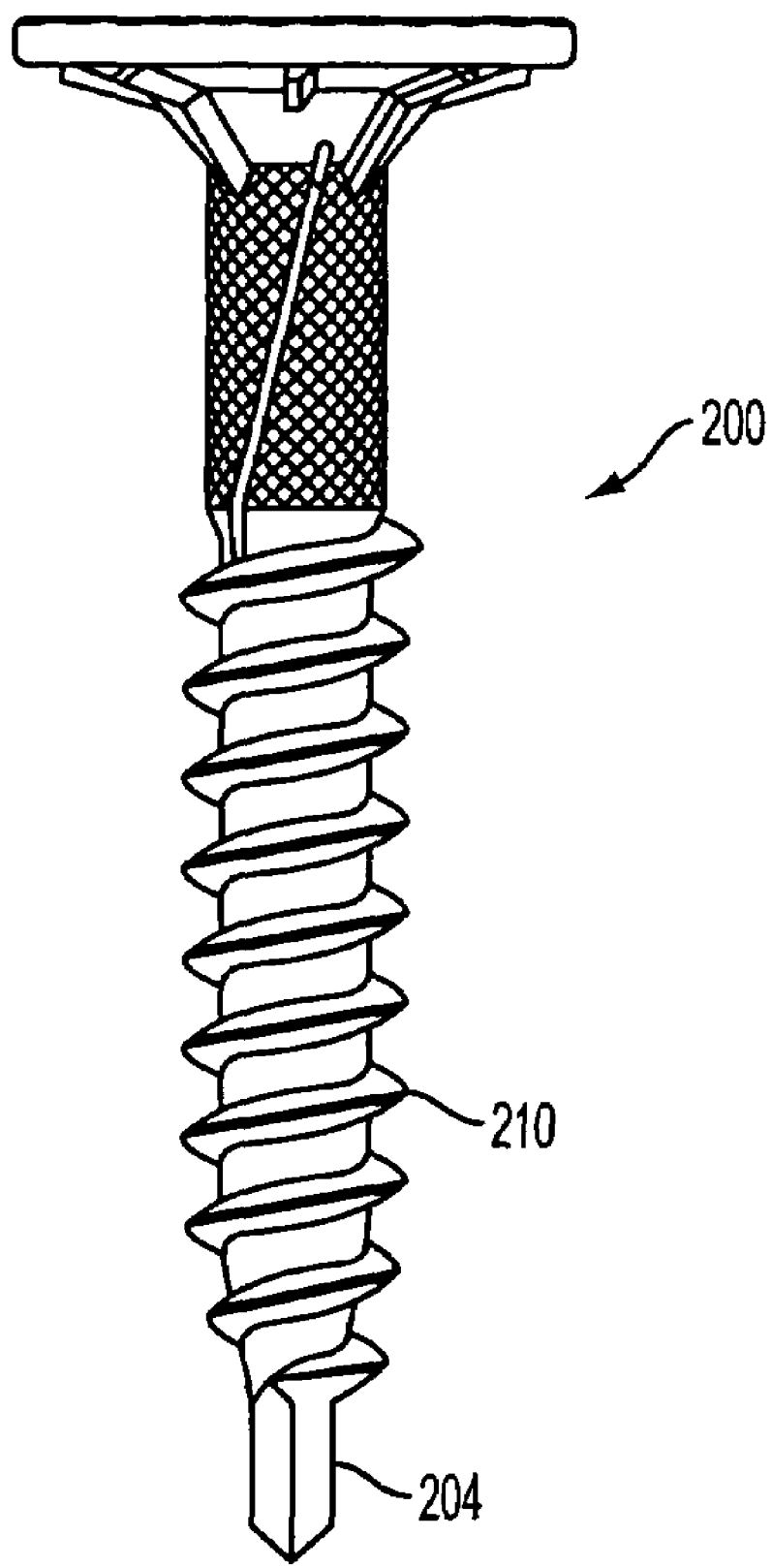
FIG. 12 is a side view of a screw according to another preferred embodiment of the present invention.
Figure 13:
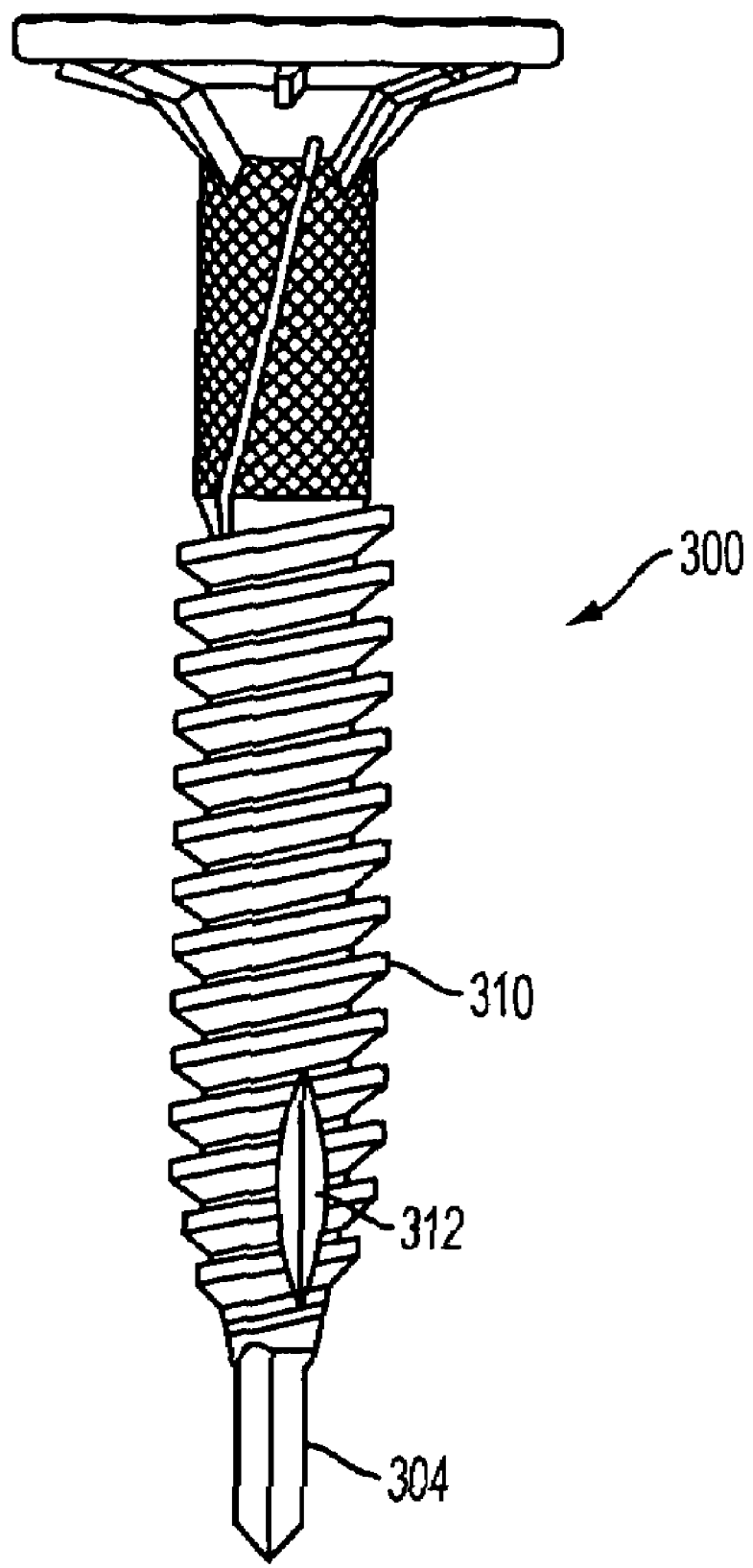
FIG. 13 is a side view of a screw according to another preferred embodiment of the present invention.

In another embodiment of the invention, illustrated in FIG. 11, a screw 100 can be formed with a drilling tip 104 rather than with the tip 4 of screw 1. Such a drilling tip 104 can be formed with a flute 120 in the thread 110, or several such flutes. The screw 100 with the drilling tip 104 could be used when the particle producing material 60 is to be secured to a base or anchor material 70 such a steel stud. The drilling tip 104 would allow the screw 100 to easily penetrate a base material during insertion of the screw. In the alternative to the flute 120 in the thread 110, the drilling tip 104 may be formed to other configurations known in the art. For example, FIG. 12 illustrates another embodiment of a screw 200 having a drilling tip 204, which is formed adjacent the thread 210. In another embodiment illustrated in FIG. 13, a screw 300 may be formed with a self-tapping thread 310 and a drilling tip 304. The self-tapping thread 310 has a flute 312, which enables the self-tapping thread 310 to easily penetrate a base material such as steel. Alternatively, the screw 300 may be formed without the drilling tip 304, or with another type of a self-tapping thread.

Figure 15:
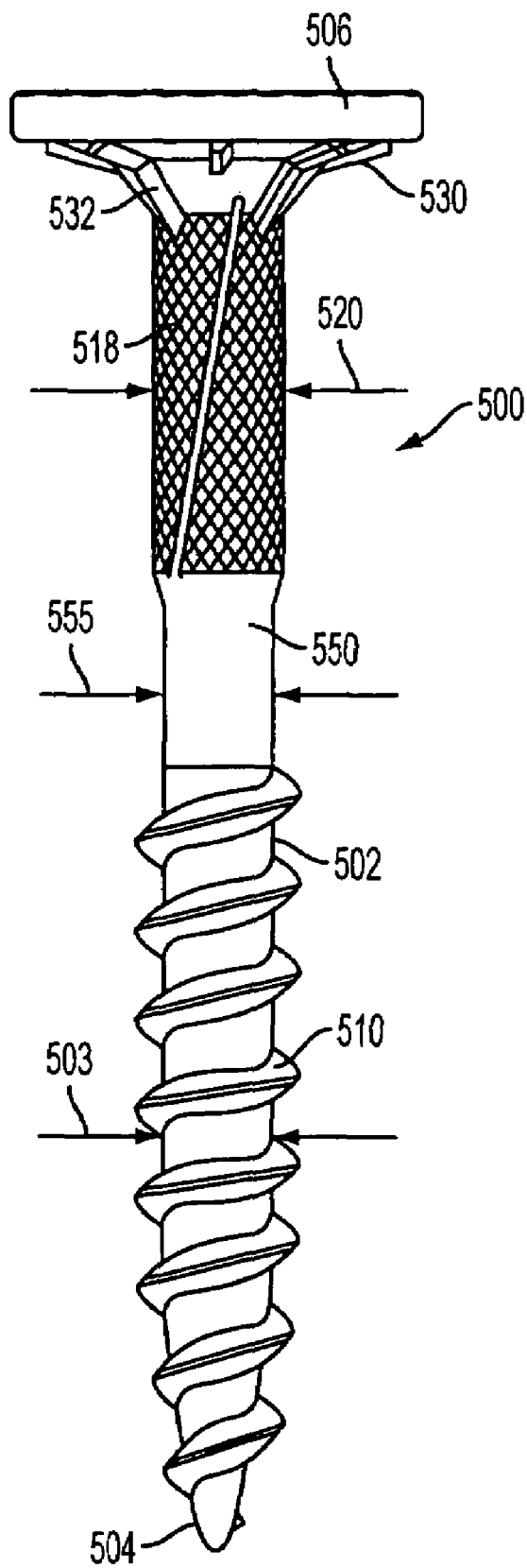
FIG. 15 is a side view of a screw according to another preferred embodiment of the present invention.
Figure 16:
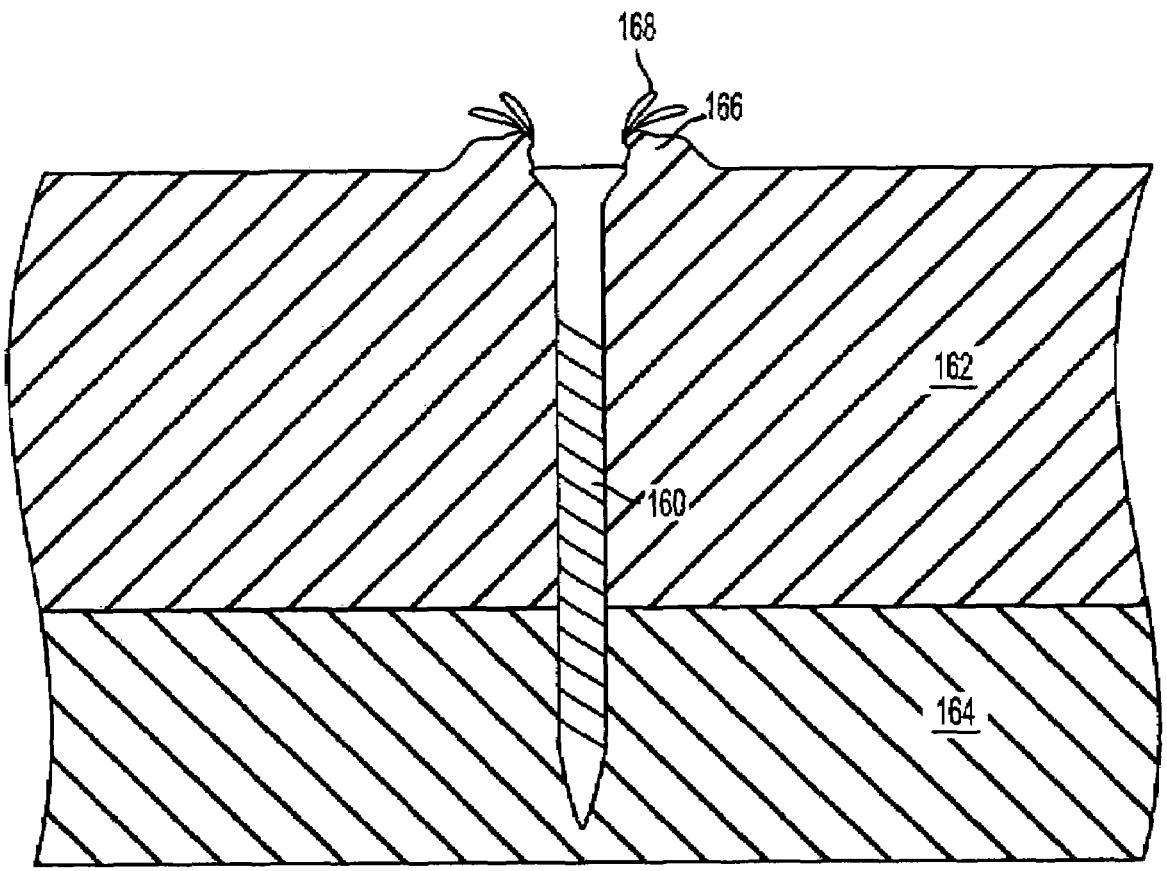
FIG. 16 is a partial cross-sectional view of a prior art screw engaged in a bulge producing material.

A screw in accordance with another embodiment of the invention is illustrated in FIG. 15. The screw 500 is useful in securing composite lumber materials to a base material. A problem associated with composite lumber is that conventional screws may produce unwanted results. Particularly, insertion of a conventional screw into composite lumber can cause remnants or shavings to be cut, extruded, or otherwise removed from the hole made by the screw, or may cause an undesirable bulge on the surface of such materials. A general representation of this problem is illustrated in FIG. 16, which shows a conventional screw 160 inserted into composite lumber or similar bulge and/or remnant producing material 162 and a base material 164. An undesirable bulge 166 and/or remnants 168 are formed on the surface of the material 162 upon insertion of the conventional screw 160. The screw of the present invention has been found to solve this problem.

The screw 500 has a shank 502 having a diameter 503. The shank 502 has a tip 504 at one end and a head 506 at the other end. The screw 500 has a thread 510 disposed on said shank near the tip 504, and a knurled portion 518 disposed near the head 506. The knurled portion 518 has a diameter 520 which is greater than the diameter 503 of the shank 502. The screw 500 also has a transition section 550 intermediate the knurled portion 518 and the thread 510. The transition section 550 has a diameter 555, which in a preferred embodiment is approximately the same as shank diameter 503, but smaller than the diameter 520 of the knurled portion 518. In other embodiments, the transition section diameter 555 may be larger or smaller than the shank diameter 503, but should be smaller than the knurled portion diameter 520. The screw 500 may also be formed without the transition section 550. The screw 500 may also have ribs 530, 532 disposed on the underside or lower surface of the head 506.

Figure 17:
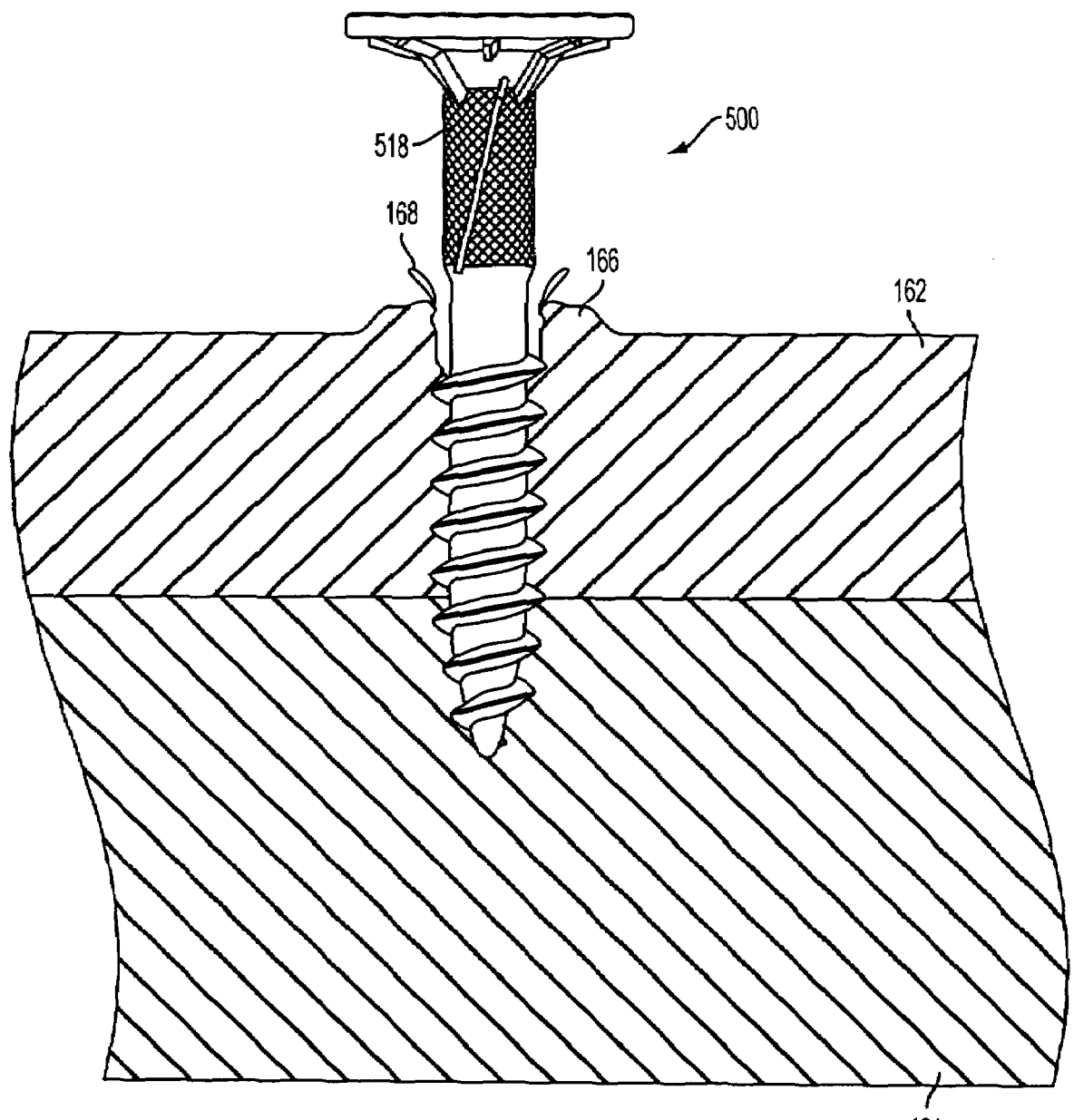
FIGS. 17 and 18 are partial cross-sectional views showing the screw of FIG. 15 engaged in a bulge producing material.
Figure 18:
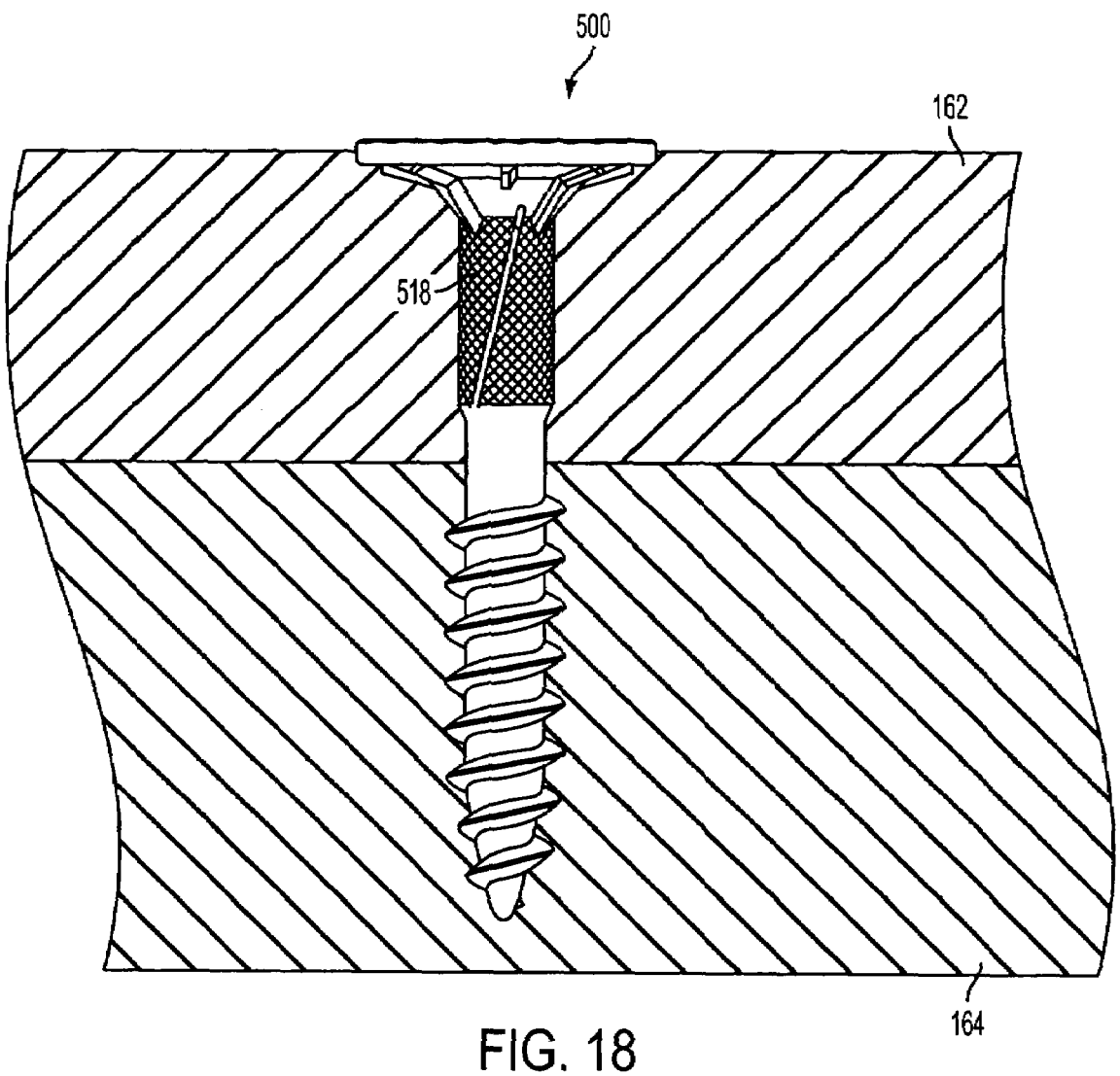

In use, with reference to FIGS. 17 and 18, when the threads of the screw 500 are inserted into a composite lumber material 162, a bulge 166 and/or remnants 168 may be produced. When the knurled portion 518 of the screw 500 enters the composite lumber material 162, the bulge 166 and/or remnants 168 are displaced into the opening created by the knurled portion 518. The displacement of the bulge 166 and/or remnants 168 into the opening is due in part to the larger diameter 520 of the knurled portion 518 compared with the diameter 503 of the shank 502, and in part to the rough surface of the knurled portion 518. In addition, any portion of the bulge 166 and/or remnants 168 remaining after the knurled portion 518 has entered the composite lumber material 162 may be cut or shaved by the ribs 530, 532. The end result is a composite lumber material with a smooth surface, as illustrated in FIG. 18. The screws 1, 100, 200, 300, 400 can be made from a variety of compliant materials, including low carbon steel and stainless steel.

The above description and drawings are only illustrative of preferred embodiments of the present inventions, and are not intended to limit the present inventions thereto. Any subject matter or modification thereof which comes within the spirit and scope of the following claims is to be considered part of the present inventions.

What is claimed as new and desired to be protected by Letters Patent of the United States is:

1. A screw comprising:
   a shank having a tip at one end and a head at the other end, said head having a lower surface;
   a thread on said shank;
   a knurled portion on said shank disposed between said thread and said head, said knurled portion comprising peaks and intersecting troughs;
   at least one flute in said knurled portion; and
   at least one rib on said lower surface of said head.

2. The screw of claim 1, further comprising a second rib on said lower surface of said head, said second rib being different from said at least one rib.

3. The claim of claim 1 wherein said at least one flute comprises two flutes.

4. The screw of claim 1 wherein said at least one flute extends onto a portion of a neck of said screw.

5. The screw according to claim 1, wherein said tip is a self-drilling tip.

6. The screw according to claim 1, further comprising a transition section between said thread and said knurled portion.

7. A screw comprising:
   a shank having a tip at one end and a head at the other end;
   a thread on said shank;
   a knurled portion on said shank disposed between said thread and said head, wherein said knurled portion comprises peaks and intersecting troughs; and
   at least one flute in said knurled portion.

8. The screw of claim 7 wherein said head has a lower surface and at least one rib on said lower surface.

9. The screw according to claim 7 wherein said head has an upper surface and said upper surface is a rough surface.

10. The screw according to claim 7 wherein said head has a lower surface and a circumferential lip on said lower surface.

11. The screw according to claim 7 further comprising a transition section between said thread and said knurled portion.

12. A screw comprising:
   a shank having a tip at one end and a head at the other end, said head having a lower surface;
   a thread on said shank;
   a knurled portion comprising peaks and intersecting troughs on said shank, disposed between said thread and said head, and at least one flute in said knurled portion and extending onto at least a portion of said thread; and
   at least a first rib on said lower surface of said head.

13. The screw according to claim 12, further comprising a second rib on said lower surface of said head, said second rib being different from said first rib.

14. The screw according to claim 12 further comprising a circumferential lip on said lower surface of said head.

15. The screw according to claim 12, wherein said second rib is disposed on said lower surface of said head and extends onto a neck of said head.

16. The screw according to claim 12 further comprising a transition section between said thread and said knurled portion.

17. A method of using a screw comprising:
   providing a screw shank having a tip, a thread, a knurled portion comprising peaks and intersecting troughs, with at least one flute, and a head;
   providing a particle producing material and a base material;
   inserting said screw, by rotation, into said particle producing material, producing particles by rotation of said knurled portion in said particle producing material;
   transporting at least some of said produced particles from said particle producing material via said at least one flute; and
   securing said particle producing material to said base material.

18. A method of using a screw comprising:
   providing a screw shank having a tip, a thread, a knurled portion comprising peaks and intersecting trough with at least one flute, and a head;
   providing a bulge producing material and a base material;
   inserting said screw, by rotation, into said bulge producing material, producing a bulge on a surface of said bulge producing material by rotation of said thread into said bulge producing material;
   displacing said bulge into said bulge producing material via said knurled portion; and
   securing said bulge producing material to said base material.

* * * * *